May 17, 1949.    J. EVANS    2,470,550
PULSE PRODUCING APPARATUS
Filed Feb. 28, 1946    2 Sheets-Sheet 1
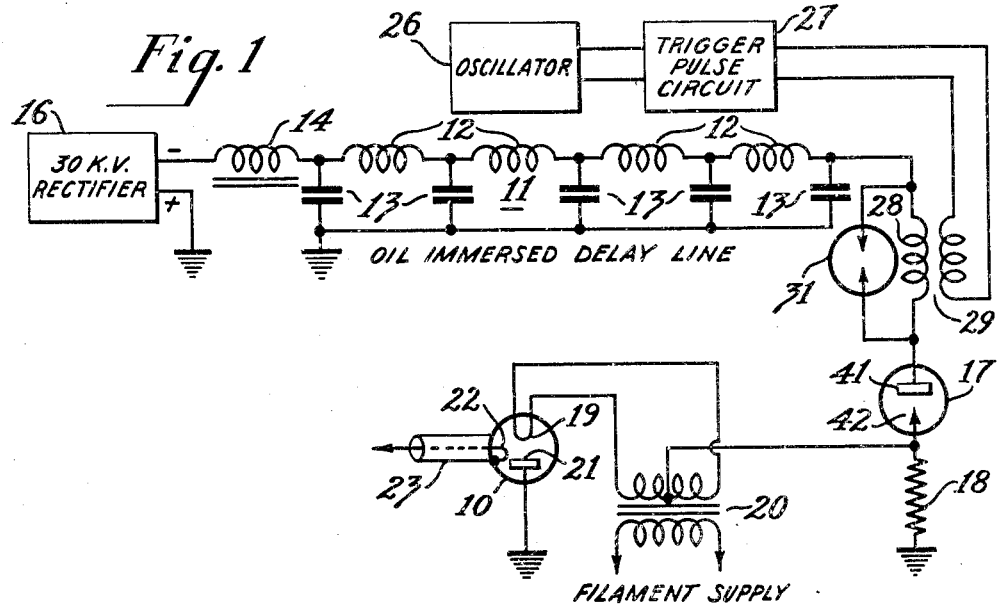
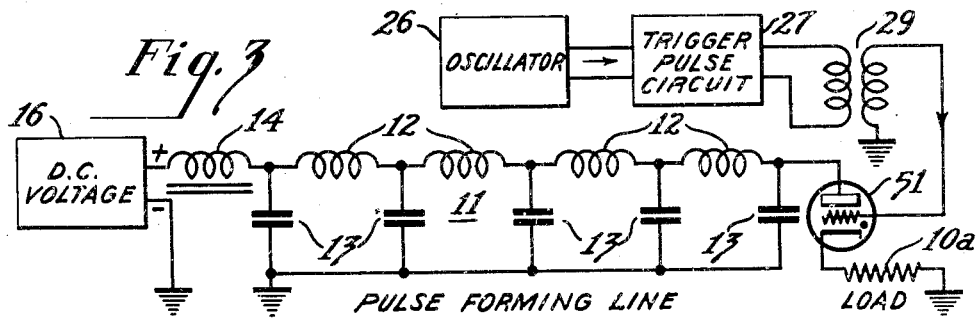
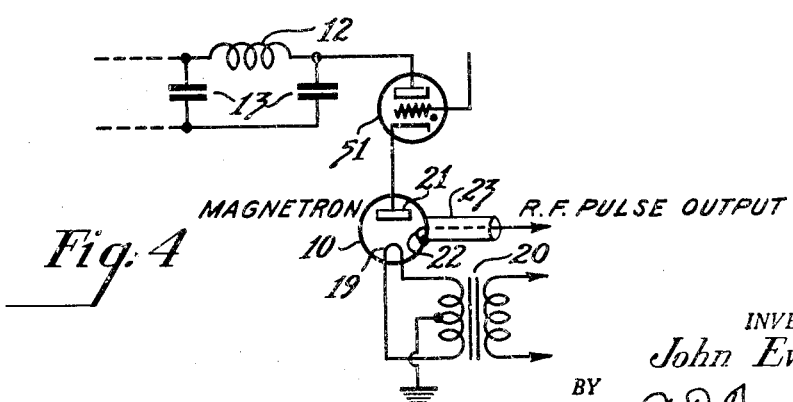
INVENTOR.
John Evans
BY
C. D. Tuska
ATTORNEY

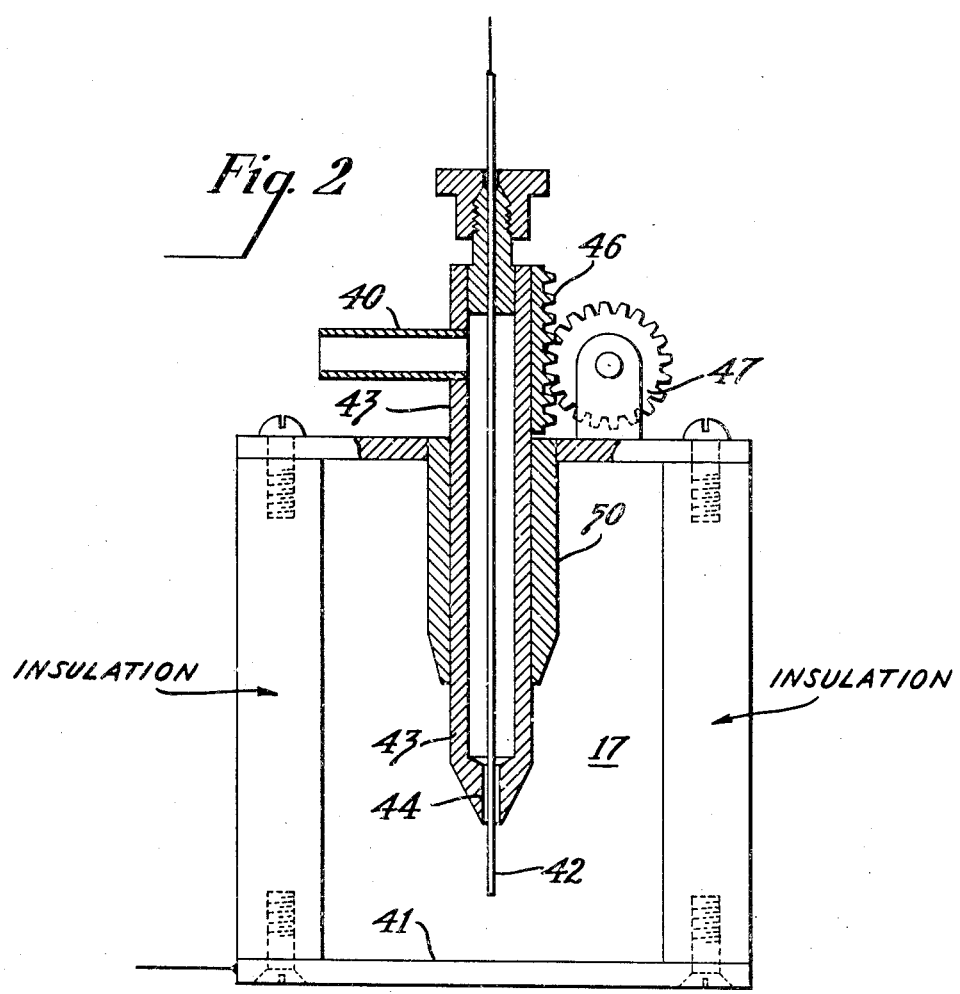

Patented May 17, 1949

2,470,550

UNITED STATES PATENT OFFICE 2,470,550

PULSE PRODUCING APPARATUS

John Evans, Hightstown, N. J., assignor to Radio Corporation of America, a corporation of Delaware Application February 28, 1946, Serial No. 650,967

13 Claims. (Cl. 250—27)

This application is a continuation in part of my copending application Serial No. 515,057, filed December 20, 1943, and entitled Pulse producing apparatus, now Patent No. 2,422,086, issued June 10, 1947.

The invention relates to the production of electrical pulses and particularly to the use of a delay network or pulse-forming line for producing pulses of definite width or duration.

An object of the invention is to provide an improved method of and means for producing electrical pulses of very large instantaneous energy.

A further object of the invention is to provide an improved method of and means for producing pulses of definite width or duration.

In a preferred embodiment of the invention a pulse-forming delay line is connected so as to be discharged periodically substantially without reflection through a load circuit, suitable means being provided for charging the line. The end of the line opposite the load end is terminated so that it is reflecting. As a result, the pulse supplied to the load circuit has a duration equal to the time required for a pulse or wave to travel down the delay line and back.

The invention will be better understood from the following description taken in connection with the accompanying drawing in which Figure 1 is a block and circuit diagram of one embodiment of the invention, Figure 2 is a side view, partly in section, of a preferred type of main spark gap for use in the circuit of Fig. 1, and Figures 3 and 4 are circuit diagrams illustrating other embodiments of the invention. Similar parts in the several figures are indicated by similar reference characters.

Fig. 1 shows an embodiment of the invention as employed for pulse modulating a radio-frequency oscillator such as a magnetron 10. The pulse-forming circuit comprises a delay line 11 which may consist of series inductors 12 and shunt capacitors 13. The line 11 may be charged at one end through a choke coil 14 by a source 16 of high voltage direct current. This end of the delay line is reflecting since it is practically open-circuited so far as the modulating pulses are concerned.

The line 11 is discharged periodically through a main spark gap 17 whereby a high voltage pulse appears across an output resistor 18 and is applied through a filament transformer 20 to the cathode 19 and through ground to the anode 21 of the magnetron 10 to produce a pulse of radio-frequency energy. This R.-F. energy is picked up by a loop 22 and transmitted over a coaxial line 23 to a load circuit such as an antenna (not shown). The load impedance at the terminals of the load resistor 18 preferably is substantially the surge impedance of the delay line 11 whereby the discharge end of the line 11 is non-reflecting.

Periodically recurring trigger pulses are produced by suitable means such as an oscillator 26 and a pulse-forming circuit 27 and applied to the secondary 28 of a transformer 29. The secondary 28 is in series with one end of the delay line 11 and the main spark gap 17 whereby the trigger voltage raises the voltage across the gap 17 enough to make it break down. In the present example, the trigger pulse frequency is 10,000 cycles per second, each pulse having a duration of $1 \times 10^{-6}$ second as applied to the triggering transformer 29.

As soon as the main gap 17 breaks down, the voltage $Ldi/dt$ across the secondary 28 due to the rise of the main pulse causes the breakdown of an auxiliary spark gap 31 whereby the coil 28 is shunted or practically short-circuited by the gap 31. The spark gap 31 may be of any suitable construction and comprises point to point electrodes in the example illustrated. Thus, the impedance of the coil 28 is effectively removed from the discharge circuit so that it will not introduce transients or otherwise disturb the wave form of the pulse applied to the magnetron 10 or other load. The pulses that are produced by discharging the line 11 have a width or duration determined by the time delay of the line 11. In the present example, this width is equal to the amount a wave is delayed when it travels down the line 11 and is reflected back. In the system being described, the modulating pulse peak output is approximately 1.3 megawatts with a pulse width at the top of the pulse of $1 \times 10^{-6}$ second.

Fig. 2 shows a preferred construction for the main spark gap 17. The two spark gap electrodes consist of a plane surface 41 which may be of stainless steel and a point electrode 42 which preferably is of tungsten. Compressed air is supplied through an inlet tube 40 to a tube 43 supporting the electrode 42 and is blown through the space 44 between the electrode 42 and the tube 43 whereby the electrodes 41 and 42 are cooled and whereby the ionized gas is blown away from the gap to increase the stability and rectifying ability of the spark gap. The air pressure is not critical. From six to fourteen pounds pressure is satisfactory. A rack 46 and pinion 47 are provided for sliding the tube 43 in a supporting sleeve 50 to adjust the gap length.

Preferably the point electrode diameter is small (0.06 inch) with respect to the gap electrode spacing (0.591 inch) so that a cold discharge takes place about the point electrode and a small "dark" current exists through the gap. When the voltage is increased, the cold discharge gives away abruptly to a continuous discharge. With a fixed electrode spacing, as long as the air pressure is maintained constant, the gap ionizing potential is precise and repeats within an error of plus or minus two percent at 30 kv. Thus, the condition of ionization and the resulting breakdown of the gap may be caused under these conditions by a slight over-voltaging of the gap.

Fig. 3 shows a pulse-producing circuit wherein the delay 11 is discharged through a gap or vapor tube 51 and through the load in series therewith which is represented by a resistor 10a. The tube 51 may be a Thyratron, for example, which is ignited when a trigger pulse is applied to its grid.

Fig. 4 shows the circuit of Fig. 3 with a magnetron 10 substituted for the load resistor 10a.

The circuits which have been described may be designed for producing pulses of a particular width or duration as follows: Assume that a four section line is to be used and that the desired pulse duration T is to be $1\mu$ sec.

Let $t = \Delta T$ which is the pulse duration that would be obtained by using one section.

$\Delta l = tZ$ is the series inductance required for one section where $Z$ is the load impedance.

$\Delta c = \frac{t}{Z}$ is the shunt capacitance required for one section.

$\Delta T = t = 0.25\mu$ sec. $= 0.25 \times 10^{-6}$ sec.

Assuming load impedance of 2000 ohms, $\Delta l = 0.25 \times 10^{-6} \times 2 \times 10^3 = 5 \times 10^{-4}$ henries.

$\Delta c = \frac{0.25 \times 10^{-6}}{2 \times 10^3} = 0.00012$ mfd. $= 1.2^{-10}$ farads.

$Z_0 = \sqrt{\frac{L}{C}}$ is the surge impedance of the delay line.

$Z_0 = \sqrt{\frac{5 \times 10^{-4}}{1.2 \times 10^{-10}}} = 2000$ ohms, this being the load impedance assumed.

Referring to Fig. 3, for example, it will be seen that pulses of current having a duration of $1\mu$ sec. each will be passed through the load 10a if the inductance coils 12 are of $5 \times 10^{-4}$ henries each, the capacitors 13 are of 0.00012 mfd. each, and the impedance of load 10a is 2000 ohms.

I claim as my invention:

1. Apparatus for producing electrical pulses and applying them to a load, comprising a time delay network which is terminated at one end to make it reflecting and which is terminated at its other end in a substantially reflectionless manner by said load, means for electrically charging said network, and means for causing said network to be discharged periodically through said load whereby there is applied to said load a pulse having a duration equal to the amount a wave is delayed in traveling the length of said delay network and back.

2. The method of utilizing a time delay network for producing and applying to a load high voltage impulses of short duration at time intervals long in relation to said short duration, comprising charging said network and periodically discharging said network into said load substantially without reflection at the load end of said network but with reflection at the other end of said network.

3. Apparatus for applying to a load high voltage impulses of short duration at time intervals long in relation to said short duration, comprising at least one electric discharge tube arranged so as normally to be non-conducting, a time delay network connected in the output circuit of said valve, said time delay network being terminated at its end remote from said tube to make it reflecting, and terminated at its other end in a substantially reflectionless manner by said load, and means for periodically charging and discharging said delay network, said last means comprising means for making said discharge tube periodically conducting.

4. Apparatus for producing electrical pulses and applying them to a load, comprising a time delay network which is terminated at one end to make it reflecting and which is terminated at its other end in a substantially reflectionless manner by said load, means for electrically charging said network, an electric discharge tube connected in series with said network and said load, and means for causing said network to be discharged periodically through said discharge tube and said load whereby there is applied to said load a pulse having a duration equal to the amount a wave is delayed in travelling the length of said delay network and back.

5. The invention according to claim 4 wherein said discharge tube is a vapor tube having a control grid.

6. The invention according to claim 4 wherein said network is charged at its reflecting end through a choke coil having a high impedance at the repetition rate of said pulses.

7. In a pulse transmission system, a load, and means for supplying said load with pulses of voltage of constant amplitude, said means including an electron discharge device having a cathode, a control electrode and another electrode, said device normally being in a non-conducting condition, an energy storing circuit connected to said other electrode of said device, a circuit for storing a charge on said energy storing circuit, a connection from said cathode to said load, and means for supplying to said control electrode a voltage pulse of sufficient magnitude and polarity for rendering said electron discharge device momentarily conductive, whereby the stored charge in said energy storing circuit discharges through said device.

8. In a radio system having a line of predetermined length and associated therewith a space path, the method of producing a pulse which comprises gradually storing a charge at a predetermined rate on said line of predetermined length, causing a discharge across said space path from one terminal of said line after the stored charge reaches a certain value, initiating at the beginning of said discharge a traveling wave on said line from said one terminal which travels down the length of said line, reflecting said wave back along said line from the other terminal thereof in such sense and magnitude as to completely and instantaneously extinguish said discharge, by reducing the discharge sustaining voltage to a value less than necessary to maintain ionization of the space path.

9. In a radio system having a line of predetermined length and associated therewith a space path, the method of producing periodically repeated equal time duration pulses which comprises gradually storing a charge at a predetermined rate on said line of predetermined length, causing a discharge across said space path from one terminal of said line after the stored charge reaches a certain value, initiating at the beginning of said discharge a traveling wave on said line from said one terminal which travels down the length of said line, and reflecting said wave back along said line from the other terminal thereof in such sense and magnitude as to completely and instantaneously extinguish said discharge by reducing the discharge sustaining voltage to a value less than necessary to maintain ionization of the space path, and repeating the foregoing steps.

10. In a radio system having a line of predetermined length and associated therewith a space path, the method of producing a pulse which comprises gradually storing a charge at a perdetermined rate on said line of predetermined length, causing a discharge across said space path from one terminal of said line after the stored charge reaches a certain value, utilizing said discharge to produce oscillations of ultra high frequency for a duration equal to the time of said discharge, initiating at the beginning of said discharge a traveling wave on said line from said one terminal which travels down the length of said line, and reflecting said wave back along said line from the other terminal thereof in such sense and magnitude as to completely and instantaneously extinguish said discharge by reducing the discharge sustaining voltage to a value less than necessary to maintain ionization of the space path.

11. In a radio system having a line of predetermined length and associated therewith a space path, the method of producing periodically repeated equal time duration pulses which comprises gradually storing a charge at a predetermined rate on said line of predetermined length, causing a discharge across said space path from one terminal of said line after the stored charge reaches a certain value, utilizing said discharge to produce an electron current flow for a duration equal to the time of said discharge, initiating at the beginning of said discharge a traveling wave on said line from said one terminal which travels down the length of said line, and reflecting said wave back along said line from the other terminal thereof in such sense and magnitude as to completely and instantaneously extinguish said discharge by reducing the discharge sustaining voltage to a value less than necessary to maintain ionization of the space path, and repeating the foregoing cycle of operations.

12. In a radio system having a line of predetermined length, the method of producing a pulse which comprises gradually storing a charge at a predetermined rate on said line of predetermined length, causing a discharge from one terminal of said line after the stored charge reaches a certain value, initiating at the beginning of said discharge a traveling wave on said line from said one terminal which travels down the length of said line, utilizing said discharge to produce high frequency oscillations, and terminating the oscillations immediately upon the arrival of said traveling wave at the other terminal of said line.

13. A radio system including means for storing up energy, said system having a transmitter arranged to transmit periodically pulses representative of the stored energy for time periods short compared to the time intervals between transmitted pulses, said means including an energy storing circuit in the form of a length of transmission of delay line having such parameters that the time it takes a wave to travel the effective length of said line is equal to one-half the duration of the pulses generated.

JOHN EVANS.

REFERENCES CITED

The following references are of record in the file of this patent:

UNITED STATES PATENTS

| Number | Name | Date |
|---|---|---|
| 2,103,362 | Hansell | Dec. 28, 1937 |
| 2,394,389 | Lord | Feb. 5, 1946 |
| 2,405,069 | Tonks | July 30, 1946 |
| 2,405,070 | Tonks | July 30, 1946 |
| 2,408,824 | Varela | Oct. 8, 1946 |